(12) United States Patent
Behling

(10) Patent No.: US 10,036,474 B2
(45) Date of Patent: Jul. 31, 2018

(54) VENTED LIFT OFF SEAL ASSEMBLIES

(71) Applicant: Hamilton Sundstrand Corporation, Charlotte, NC (US)

(72) Inventor: David S. Behling, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 149 days.

(21) Appl. No.: 14/862,956

(22) Filed: Sep. 23, 2015

(65) Prior Publication Data

US 2017/0082203 A1  Mar. 23, 2017

(51) Int. Cl.
*F16J 15/34* (2006.01)

(52) U.S. Cl.
CPC ....... *F16J 15/3412* (2013.01); *F16J 15/3404* (2013.01); *F16J 15/3408* (2013.01); *F16J 15/342* (2013.01); *F16J 15/3452* (2013.01)

(58) Field of Classification Search
CPC .. F16J 15/3404; F16J 15/3408; F16J 15/3412; F16J 15/342
USPC .................................. 277/400, 401
See application file for complete search history.

(56) References Cited

U.S. PATENT DOCUMENTS

| 3,527,465 | A | * | 9/1970 | Guinard | F04C 15/0038 277/400 |
| 3,640,541 | A | | 2/1972 | Taschenberg | |
| 3,804,424 | A | | 4/1974 | Gardner | |
| 5,066,026 | A | * | 11/1991 | Heck | F16J 15/3484 277/400 |
| 5,174,584 | A | * | 12/1992 | Lahrman | F16J 15/3412 277/400 |
| 5,447,316 | A | * | 9/1995 | Matsui | F16J 15/3412 277/400 |
| 5,556,111 | A | * | 9/1996 | Sedy | F16J 15/3412 277/400 |
| 5,702,110 | A | * | 12/1997 | Sedy | F16J 15/3412 277/400 |
| 5,722,665 | A | * | 3/1998 | Sedy | F16J 15/3412 277/400 |
| 5,941,532 | A | | 8/1999 | Flaherty et al. | |
| 6,257,589 | B1 | | 7/2001 | Flaherty et al. | |
| 6,454,268 | B1 | * | 9/2002 | Muraki | F16J 15/3484 277/361 |
| 9,228,660 | B2 | * | 1/2016 | Hosoe | F16J 15/3412 |
| 2002/0109302 | A1 | * | 8/2002 | Muraki | F16J 15/3484 277/408 |

(Continued)

FOREIGN PATENT DOCUMENTS

| CN | 102022542 A | 4/2011 |
| EP | 0803668 A1 | 10/1997 |

*Primary Examiner* — Nicholas L Foster
(74) *Attorney, Agent, or Firm* — Locke Lord LLP; Scott D. Wofsy; Christopher J. Cillié

(57) ABSTRACT

A seal assembly includes a first sealing ring defining a plurality of circumferentially spaced depressions configured to form a lift off seal with the first sealing ring rotating and to prevent leakage radially with the first sealing ring at rest. At least one ventilation channel extends from a respective edge of one of the depressions to an edge of the first sealing ring and is configured to relieve pressure with the first sealing ring at rest. The first sealing ring can have an inner diameter and an outer diameter such that the plurality of depressions are defined between the inner and outer diameters.

11 Claims, 2 Drawing Sheets

(56) References Cited

U.S. PATENT DOCUMENTS

| | | | |
|---|---|---|---|
| 2004/0256809 A1* | 12/2004 | Dardalis | F01B 15/007 277/399 |
| 2012/0217705 A1* | 8/2012 | Hosoe | F16J 15/3412 277/400 |
| 2013/0209011 A1* | 8/2013 | Tokunaga | F16C 17/045 384/123 |
| 2014/0197600 A1* | 7/2014 | Hosoe | F16J 15/3412 277/409 |
| 2014/0217676 A1* | 8/2014 | Hosoe | F16J 15/3412 277/350 |
| 2015/0123350 A1* | 5/2015 | Itadani | F16J 15/3424 277/400 |

\* cited by examiner

VENTED LIFT OFF SEAL ASSEMBLIES

BACKGROUND OF THE INVENTION

1. Field of the Invention

The present disclosure relates to seal assemblies, and more particularly to lift off seals.

2. Description of Related Art

Lift off seal assemblies are frequently used, e.g., in electrical motors/generators in engines. Such assemblies utilize lift off seals which spin at a high rate and provide considerable life by reducing the temperatures at the seal interface. By design, lift off seals pump a small amount of air into the sealed component. When installed in a vented component, this small amount of air flow is not a problem. When installed in a non-vented or sealed component the small amount of air flow increases the internal case pressure of the component which can cause undesirable effects, e.g., leakage of fluid, which can reduce the lifespan of the motor/generator Such conventional methods and systems have generally been considered satisfactory for their intended purpose. However, there is still a need in the art for improved seal assemblies. The present disclosure provides a solution for this need.

SUMMARY OF THE INVENTION

A seal assembly includes a first sealing ring defining a plurality of circumferentially spaced depressions configured to form a lift off seal with the first sealing ring rotating and to prevent leakage radially with the first sealing ring at rest. At least one ventilation channel extends from a respective edge of one of the depressions to an edge of the first sealing ring and is configured to relieve pressure with the first sealing ring at rest. The first sealing ring can have an inner diameter and an outer diameter such that the plurality of depressions are defined between the inner and outer diameters.

The ventilation channel can extend from a respective depression to the outer diameter of the first sealing ring. The ventilation channel can also extend through a portion of the respective depression towards the inner diameter of the first sealing ring. The ventilation channel can have a depth through a surface of the first sealing ring greater than a depth of the depressions. The ventilation channel can be etched within a surface of the first sealing ring.

A second sealing ring can be sealed to the first sealing ring. The second sealing ring can be in contact with the first sealing ring with the first sealing ring at rest. The second sealing ring can be spaced from the first sealing ring with the first sealing ring rotating to form a lift off seal between the first and second sealing rings. The first and second sealing rings can provide a solid sealing interface with the first sealing ring at rest. The sealing interface can limit flow of a fluid from across the sealing interface. The ventilation channel can provide a flow path through the solid sealing interface to equalize pressure there across when the first sealing ring is at rest.

The first sealing ring can include two or more ventilation channels as described above symmetrically spaced apart along the sealing ring. The first sealing ring can rotate in response to a rotating shaft and the second sealing ring can remain stationary. The ventilation channels can be configured such that they do not cause leakage when the inner sealing ring is rotating.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
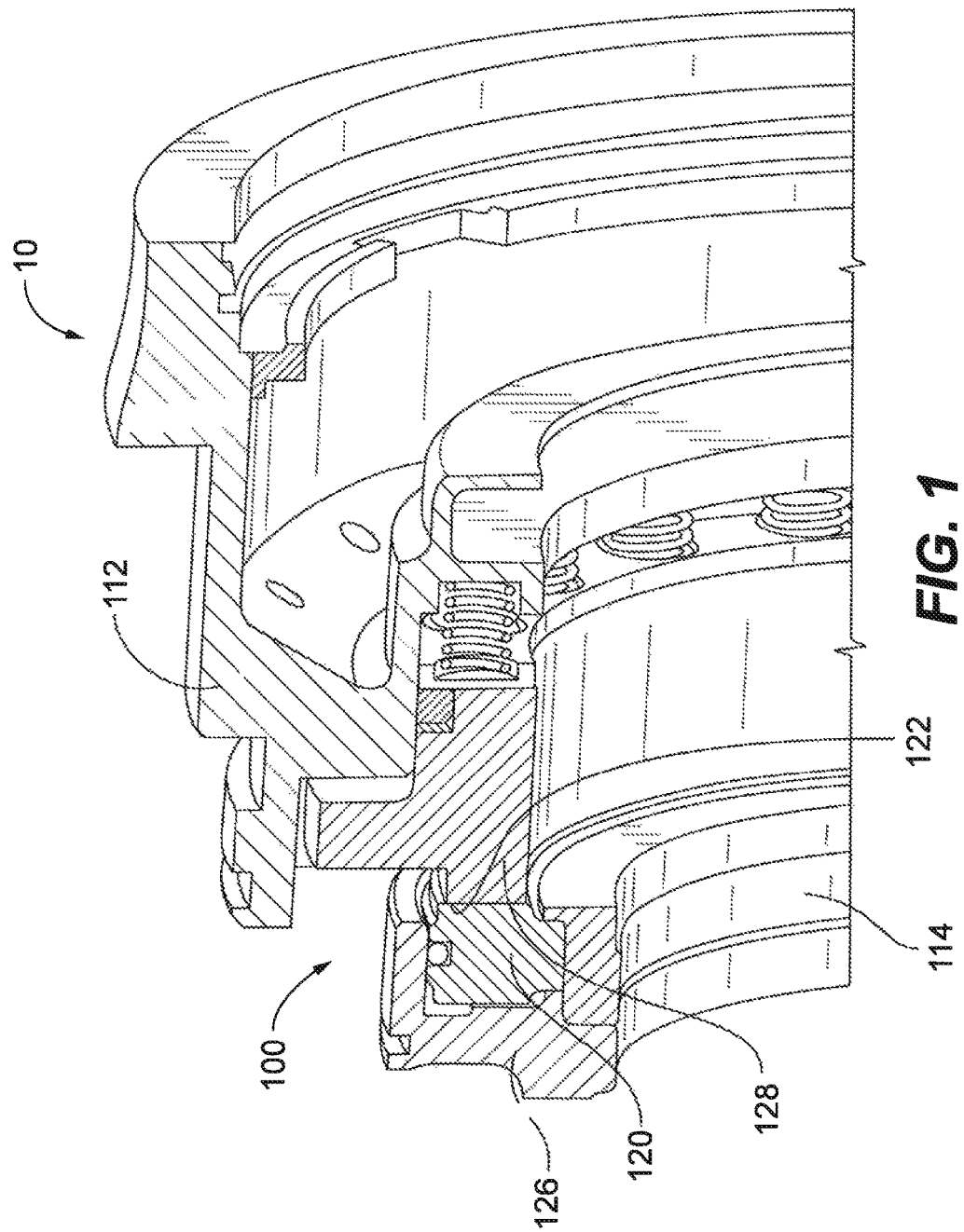
FIG. 1 is a perspective cross-section view of an exemplary embodiment of a vented lift off seal assembly, showing first and second sealing rings.

Reference will now be made to the drawings wherein like reference numerals identify similar structural features or aspects of the subject disclosure. For purposes of explanation and illustration, and not limitation, a partial view of an exemplary embodiment of a vented lift off seal assembly in accordance with the disclosure is shown in FIG. 1 and is designated generally by reference character 100. Other embodiments of the seal assembly in accordance with the disclosure, or aspects thereof, are provided in FIGS. 2-3, as will be described.

FIG. 1 illustrates a general partial schematic view of a motor/generator 10 such as used in a gas turbine engine. The motor/generator 10 includes a liftoff seal assembly 100 located between a static structure 112 such as a motor/generator housing and a rotational structure 114 such as a motor/generator shaft. The liftoff carbon seal assembly 100 generally includes a first sealing ring 120 and a second sealing ring 122. The first sealing ring 120 acts as a mating ring coupled to a rotational structure 126 and rotates during operation (also illustrated separately in FIG. 2) while the second sealing ring 122 remains stationary. As with typical lift off seals, when the engine is in operation, lifting geometry of the first sealing ring 120 generates a fluid-dynamic force causing the second sealing ring 122 to separate and create a gap between the two rings 120, 122. In other words, the second sealing ring 122 is sealed with the first sealing ring 120 when the engine 10 is turned off and the first sealing ring 120 is at rest and moves to a second, spaced apart position when the engine 10 is turned on and the first sealing ring 120 is rotating to form a lift off seal.

Figure 2:
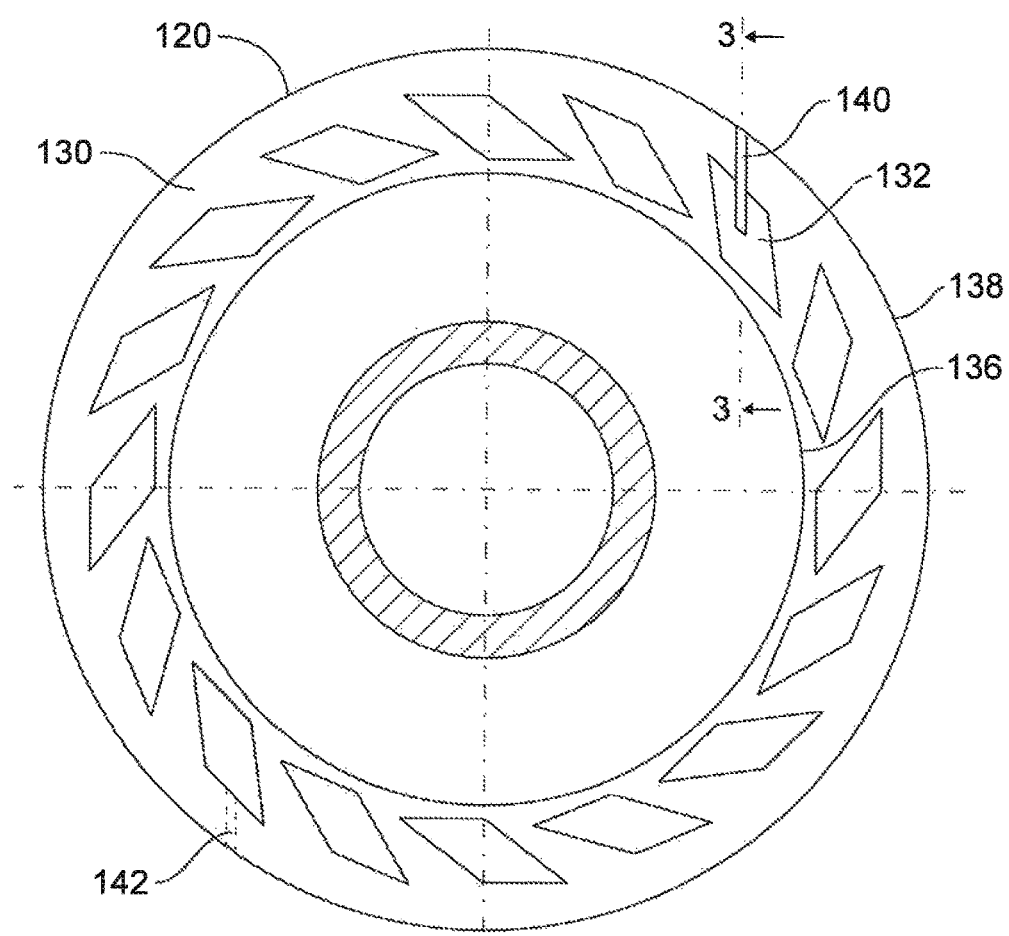
FIG. 2 is a schematic plan view of the first sealing ring of FIG. 1.

With referenced to FIG. 2, a schematic top view of the first sealing ring 120 is shown. The top surface 130 of the first sealing 120 ring mates with the second sealing ring 122 at a solid sealing interface 128 (shown in FIG. 1) when in the first sealing ring 120 is at rest. The sealing interface 128 limits fluid flow across the first sealing ring 120. A plurality of circumferentially spaced depressions 132 are defined along the top surface 130 and configured to prevent leakage radially with the first sealing ring at rest. The depressions 132 are defined between an inner diameter 136 and an outer diameter 138 of the first sealing ring 120. During operation of the engine, the depressions 132 direct gas outward from the inner diameter 136 to the outer diameter 138. The action of the gas flowing across the surfaces 130 generates pressure that keeps a gap between the sealing rings 120, 122, therefore optimizing fluid film stiffness and providing protection against face-to-face contact. The action of the gas flowing across the surfaces 130 can also cause excess pressure buildup within the motor/generator housing. This excess pressure can cause leakage and other undesirable effects.

Figure 3:
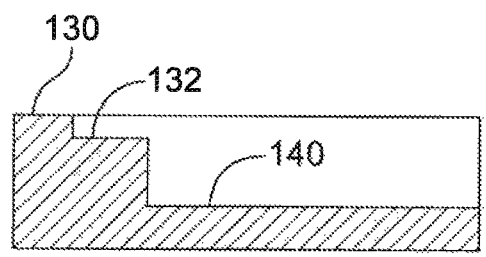
FIG. 3 is a schematic cross-sectional view taken along line 3-3 of FIG. 2.

In typical seal assemblies, when the engine is turned off and the sealing rings 120,122 are in contact, fluid leakage is prevented across the surfaces 130 via a sealing land configured between the outside edge of the depressions 132 and the outer diameter 138 of the first sealing ring 120, and any excess pressure developed during operation is retained within the housing. To relieve this excess pressure at least one ventilation channel 140 extends from a respective depression 132 to the outer diameter 138 of the first sealing ring 120. The ventilation channel 140 provides a flow path through the sealing interface 128 to equalize pressure thereacross when the engine is turned off and the sealing rings 120, 122 are in contact. Not only does the ventilation channel 140 extend from the respective depression 132 but the ventilation channel 140 also extends through a portion of the respective depression 132. As shown in FIG. 3, the ventilation channel 140 has a depth through the surface 130 of the sealing ring 120 greater than a depth of the respective depression 132. Shown in FIG. 2 is one ventilation channel with an outline for a second ventilation channel 142 symmetrically spaced apart within the sealing ring 120. Those skilled in the art will recognize that the first sealing ring 120 can include a ventilation channel 140 with each depression 132, if desired. The ventilation channel 132 can be etched within a surface of the first sealing ring, for example, using end mill during production. The depth of the ventilation channel 140 can be configured such that it does not interfere with the normal lift off seal performance when the first sealing ring 120 is rotating.

The methods and systems of the present disclosure, as described above and shown in the drawings, provide for a seal assembly with superior properties including a ventilation channel to relieve pressure and prevent excess leakage. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A seal assembly, comprising:
   a first sealing ring having an axial sealing surface and extending about a rotation axis; and
      a second sealing ring extending about the rotation axis and facing the axial sealing surface of the first sealing ring,
   the first sealing ring comprising:
      a plurality of depressions, the plurality of depressions being circumferentially spaced around the first sealing ring to form a lift off seal between the first and second sealing rings when the first sealing ring is rotating and to prevent leakage radially between the first and second sealing rings when the first sealing ring is at rest; and
      at least one ventilation channel fluidly coupling a respective one of the depressions to an edge of the first sealing ring and configured to relieve pressure when the first sealing ring is at rest,
      wherein a radially inner portion of the at least one ventilation channel axially and radially overlaps the respective one of the depressions, and
      wherein the at least one ventilation channel and the plurality of depressions are open to the axial sealing surface.

2. The seal assembly of claim 1, wherein the first sealing ring has an inner diameter and an outer diameter such that the plurality of depressions are defined between the inner and outer diameters.

3. The seal assembly of claim 2, wherein the at least one ventilation channel extends from a respective one of the depressions to the outer diameter of the first sealing ring.

4. The seal assembly of claim 1, wherein the at least one ventilation channel has a depth through the axial sealing surface of the first sealing ring greater than a depth of the depressions.

5. The seal assembly of claim 1, wherein the at least one ventilation channel is etched within the axial sealing surface of the first sealing ring.

6. The seal assembly of claim 1, wherein the second sealing ring is sealed to the first sealing ring when the first sealing ring is at rest, the second sealing ring is spaced apart from the first sealing ring when the first sealing ring is rotating to form the lift off seal between the first and second sealing rings.

7. The seal assembly of claim 6, wherein the first and second sealing rings provide a solid sealing interface when the first sealing ring is at rest.

8. The seal assembly of claim 7, wherein the at least one ventilation channel can provide a flow path through the solid sealing interface to equalize pressure thereacross.

9. The seal assembly of claim 1, wherein the at least one ventilation channel includes two ventilation channels positioned opposite one another along a circumferential direction on the first sealing ring.

10. The seal assembly of claim 6, wherein the first sealing ring is a rotational member that is connected to a rotating shaft and the second sealing ring is a stationary member.

11. The seal assembly of claim 1, wherein the at least one ventilation channel and the plurality of depressions are axially offset from the axial sealing surface defied by the first sealing ring, and wherein the at least one ventilation channel is circumferentially aligned to the plurality of depressions.

* * * * *